(12) United States Patent
Ma et al.

(10) Patent No.: US 8,973,610 B2
(45) Date of Patent: Mar. 10, 2015

(54) PNEUMATIC CONTROL VALVE AND PNEUMATIC CONTROL SYSTEM

(75) Inventors: Hai-Feng Ma, Shenzhen (CN); Xiao-Bing Xu, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 256 days.

(21) Appl. No.: 13/477,276

(22) Filed: May 22, 2012

(65) Prior Publication Data

US 2013/0146165 A1  Jun. 13, 2013

(30) Foreign Application Priority Data

Dec. 11, 2011  (CN) .......................... 2011 1 0413123

(51) Int. Cl.
*F16K 11/07* (2006.01)

(52) U.S. Cl.
USPC ............ 137/625.66; 137/625.69; 137/596.14; 251/25; 251/230; 251/256

(58) Field of Classification Search
CPC ....... F16K 11/065; F16K 7/14; F16K 31/528; F16K 31/52408; F16H 61/38; F15B 2211/355
USPC ............ 137/624.11, 624.12, 624.13, 624.14, 137/624.15, 624.17, 624.18, 624.2, 624.22, 137/625.17, 625.6, 625.69, 630.2, 636.1, 137/596.14, 625.66; 251/230, 251, 252, 251/253, 254, 256, 257, 258, 262, 263, 25
See application file for complete search history.

(56) References Cited

U.S. PATENT DOCUMENTS

| 3,220,695 A | * | 11/1965 | Jones et al. ................... 251/263 |
| 3,618,636 A | * | 11/1971 | Grimland et al. .......... 137/625.6 |
| 3,735,771 A | * | 5/1973 | Panissidi .................... 137/15.04 |
| 3,790,125 A | * | 2/1974 | Swatty ............................ 251/75 |
| 4,372,193 A | * | 2/1983 | Hall .............................. 91/420 |
| 4,383,477 A | * | 5/1983 | Nilsson et al. ............... 454/274 |
| 4,580,590 A | * | 4/1986 | Brinkel et al. ............... 137/106 |
| 4,632,361 A | * | 12/1986 | Callison ....................... 251/230 |
| 5,628,490 A | * | 5/1997 | Roberts et al. ................. 251/57 |
| 6,047,949 A | * | 4/2000 | Beauchemin, Jr. .......... 251/257 |
| 6,276,659 B1 | * | 8/2001 | Wang ............................ 251/58 |
| 6,595,104 B2 | * | 7/2003 | Pinciaro ........................ 91/461 |
| 8,028,356 B2 | * | 10/2011 | Kao et al. ......................... 4/678 |
| 8,413,673 B2 | * | 4/2013 | Sacchetti ...................... 137/112 |
| 8,561,640 B2 | * | 10/2013 | McConnell et al. .......... 137/523 |

(Continued)

FOREIGN PATENT DOCUMENTS

CN  2828478 Y  10/2006
CN  202017792 U  10/2011

*Primary Examiner* — Matthew W Jellett
(74) *Attorney, Agent, or Firm* — Novak Druce Connolly Bove + Quigg LLP (57) ABSTRACT

A pneumatic control valve includes a first valve body, a pushing block, a rotating block, a second valve body, an end cover, and a piston. The first valve body defines a first gas inlet and a receiving hole. The first valve body forms a plurality of guiding ribs evenly positioned on the inner surface of the receiving hole away from the first gas inlet, and each of the guiding ribs forms an inclined surface at a distal end thereof. The pushing block and the rotating block are slidably received in the receiving hole. The second valve body is connected to an end of the first valve body adjacent to the receiving hole of the first valve body. The end cover is fastened on an end of the second valve body away from the first valve body. A pneumatic control system using the pneumatic control valve is also provided.

12 Claims, 11 Drawing Sheets

(56) References Cited

U.S. PATENT DOCUMENTS

| | | | |
|---|---|---|---|
| 8,573,558 B2* | 11/2013 | Wang | 251/28 |
| 2007/0113906 A1* | 5/2007 | Sturman et al. | 137/625.65 |
| 2007/0170679 A1* | 7/2007 | Stender et al. | 280/124.16 |
| 2012/0080633 A1* | 4/2012 | Xu | 251/326 |

* cited by examiner

PNEUMATIC CONTROL VALVE AND PNEUMATIC CONTROL SYSTEM

BACKGROUND

1. Technical Field

The present disclosure generally relates to control valves, and particularly to a pneumatic control valve and a pneumatic control system using the pneumatic control valve.

2. Description of Related Art

Pneumatic control systems are widely applied in many fields such as air pressure equipment, to control the direction of gas flow. A commonly used pneumatic control system includes a pneumatic control valve and a manual control valve; the manual control valve is to control the pneumatic control valve to turn the direction of gas flow. However, it is generally not safe for an operator to operate the manual control valve to control the pneumatic control valve by one hand. In addition, the commonly used pneumatic control valve has a poor structure and is prone to operate accidentally due to unintended accidental operation, thereby generating a potential safety hazard to the operator.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
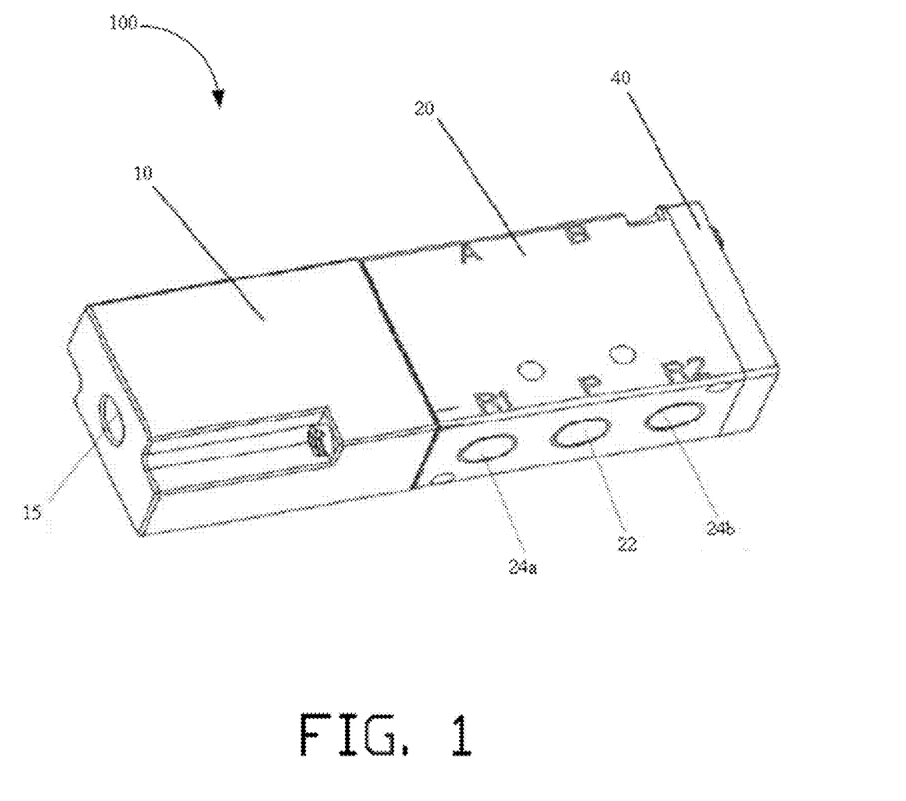
FIG. 1 is an isometric, assembled view of an embodiment of a pneumatic control valve.

FIG. 1, is an embodiment of a pneumatic control valve 100 including a first valve body 10, a second valve body 20 connected to an end of the first valve body 10, and an end cover 40 fastened on an end of the second valve body 20 away from the first valve body 10.

Figure 8:
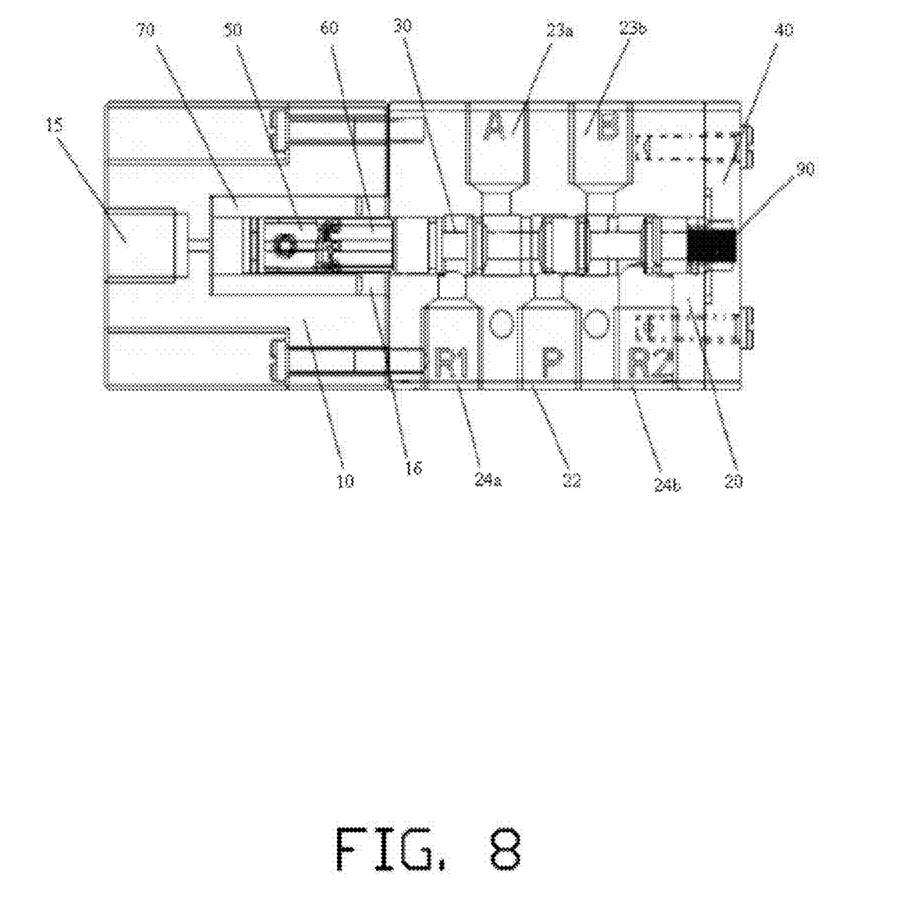
FIG. 8 is a plan view of the pneumatic control valve of FIG. 1.

FIGS. 2 through 6, show that the first valve body 10 is a substantially rectangular block. The first valve body 10 defines a first gas inlet 15 and a receiving hole 16 (as shown in FIG. 8) communicating with the first gas inlet 15. The pneumatic control valve 100 further includes a fastening tube 70, a pushing block 50 and a rotating block 60. The fastening tube 70 is fastened in the receiving hole 16. The pushing block 50 is slidably received in one end of the fastening tube 70 adjacent to the first gas inlet 15, and the rotating block 60 is slidably received in the other end of the fastening tube 70.

Figure 4:
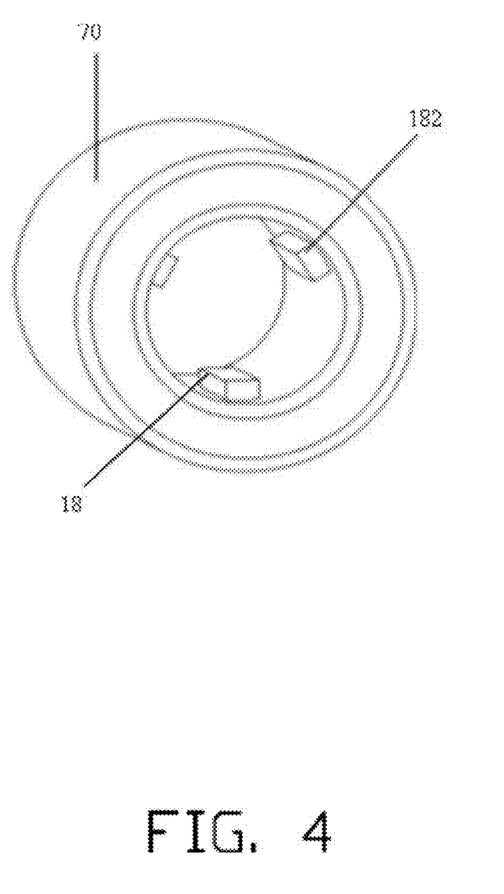
FIG. 4 is an isometric view of the fastening tube of FIG. 3.
Figure 5:
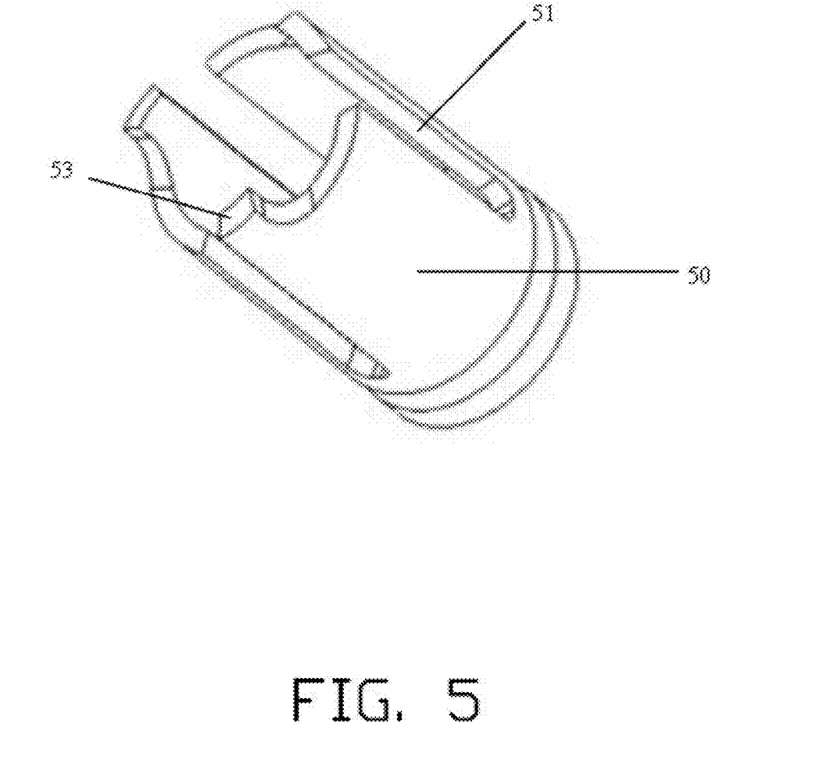
FIG. 5 is an isometric view of the pushing block of FIG. 3.
Figure 6:
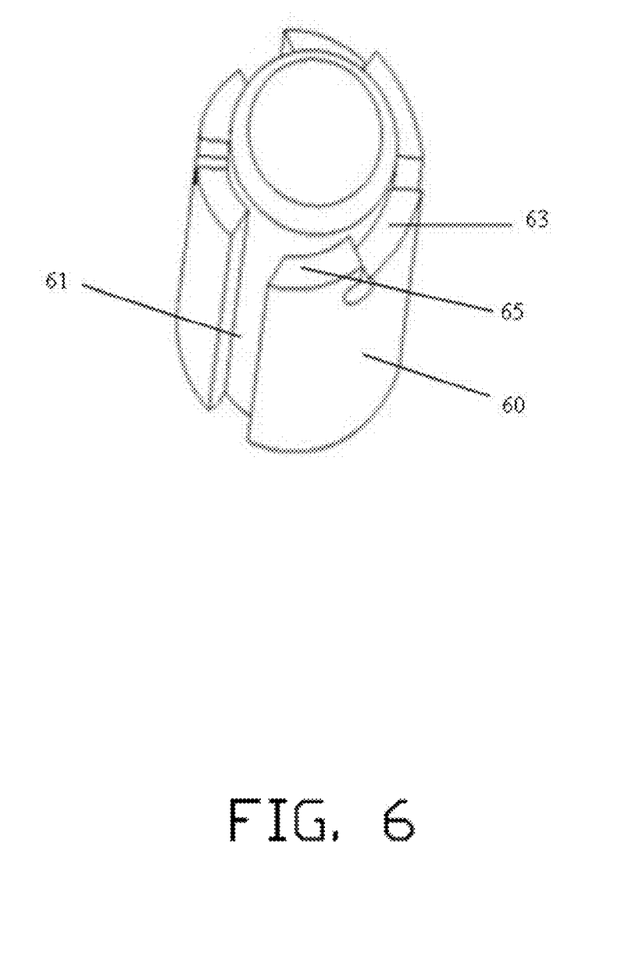
FIG. 6 is an isometric view of the rotating block of FIG. 3.

In the illustrated embodiment, the fastening tube 70, the pushing block 50 and the rotating block 60 are all substantially cylindrical. The fastening tube 70 axially forms three guiding ribs 18 evenly positioned on the inner surface of the fastening tube 70. Each of the guiding ribs 18 forms an inclined surface 182 at a distal end thereof adjacent to the second valve body 20. The pushing block 50 axially defines three guiding grooves 51 in the pushing block 50 corresponding to the three guiding ribs 18 of the fastening tube 70 and forms three inclined surfaces 53 at an end of the pushing block 50 adjacent to the rotating block 60. The rotating block 60 also axially defines three sliding grooves 61 in the outer surface of the rotating block 60 corresponding to the three guiding ribs 18. The rotating block 60 also defines three pairs of spiral surfaces at an end of the rotating block 60 adjacent to the pushing block 50. Each pair of the spiral surfaces is located between two sliding grooves 61. In the illustrated embodiment, each pair of spiral surfaces includes a first spiral surface 63 and a second spiral surface 65 adjacent to the first spiral surface 63.

Figure 7:
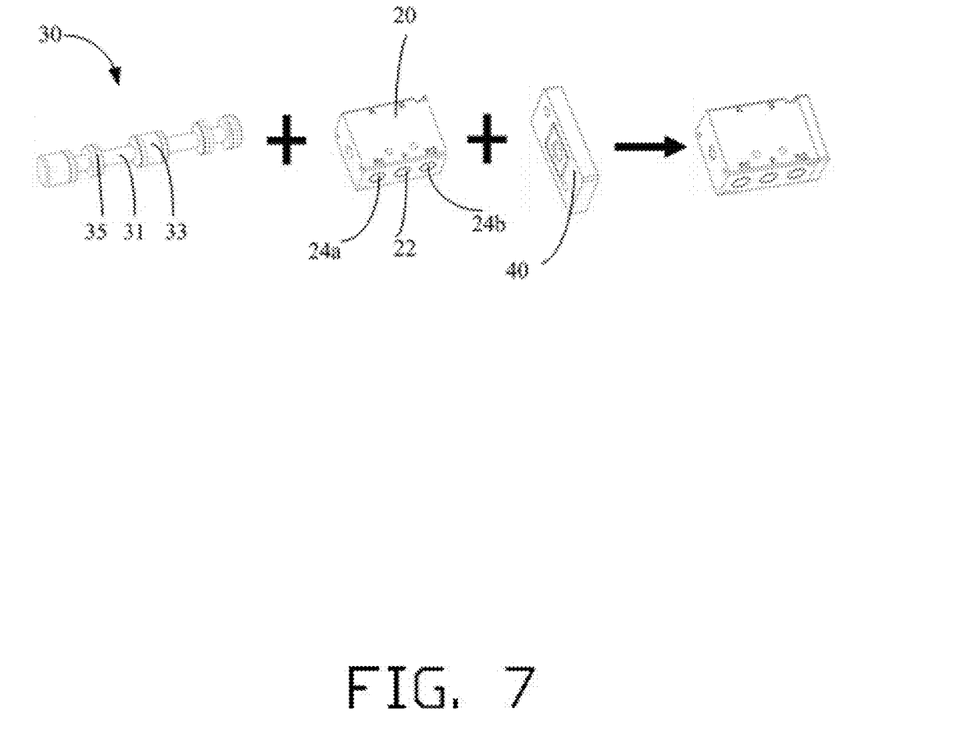
FIG. 7 an exploded, isometric view of the second valve body of FIG. 2.

Referring to FIGS. 7 and 8, the second valve body 20 is a substantially rectangular block. The second valve body 20 defines a second gas inlet 22, two vents 24a, 24b at a first side wall of the second valve body 20 and a first gas outlet 23a and a second gas outlet 23b at a second side wall of the second valve body 20 opposite to the first side wall. The two vents 24a, 24b are located at opposite sides of the second gas inlet 22. The pneumatic control valve 100 further includes a piston 30 received in the second valve body 20 and an elastic member 90 fastened to the piston 30. The piston 30 includes a piston rod 31 and five piston heads 33 sleeved on the piston rod 31. The piston head 33 that is sleeved at about the center of the piston rod 31 includes two seal members 35 sleeved at two opposite ends thereof. Each of the other piston heads 33 includes a seal member 35 sleeved at about the center of each of the other piston heads 33. The piston rod 31 with the five piston heads 33 are slidably received in the second valve body 20. A first end of the piston rod 31 resists with a distal end of the rotating block 60, and a second end of the piston rod 31 opposite to the first end thereof is fastened to the end cover 40 via the elastic member 90.

Figure 2:
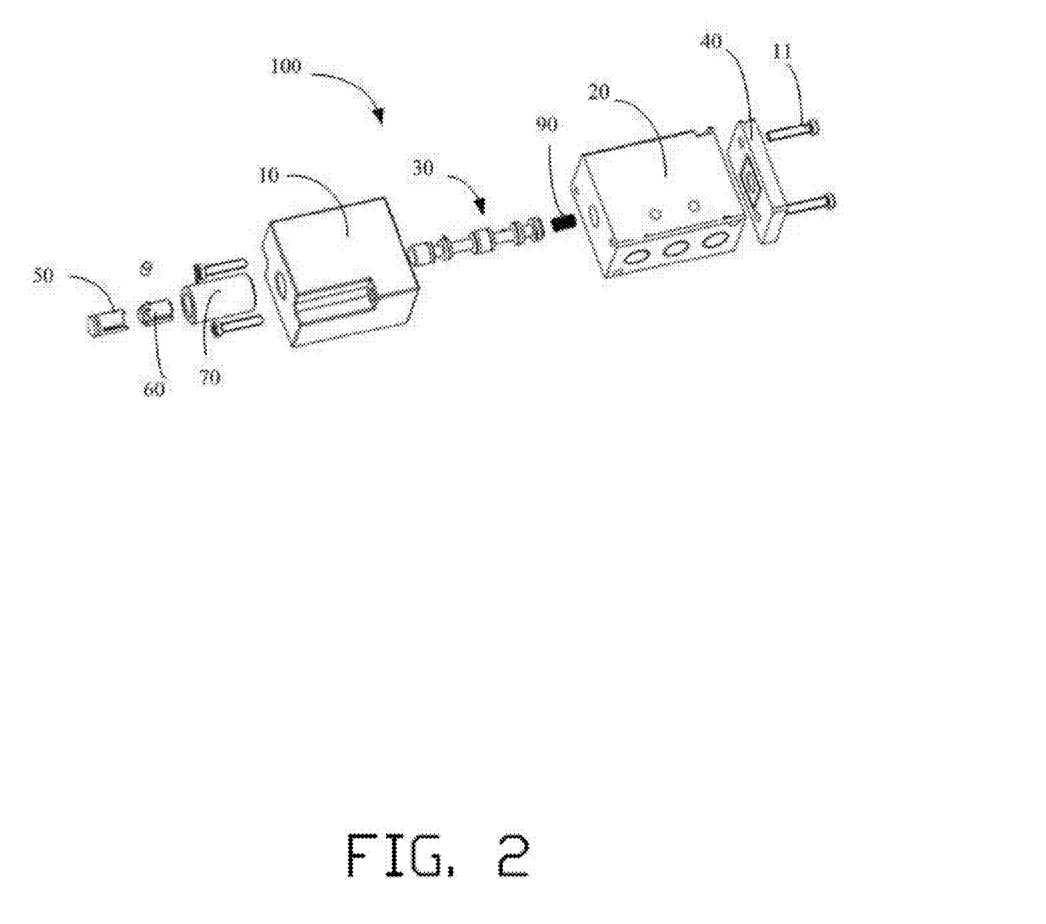
FIG. 2 is an exploded, isometric view of the pneumatic control valve of FIG. 1.
Figure 3:
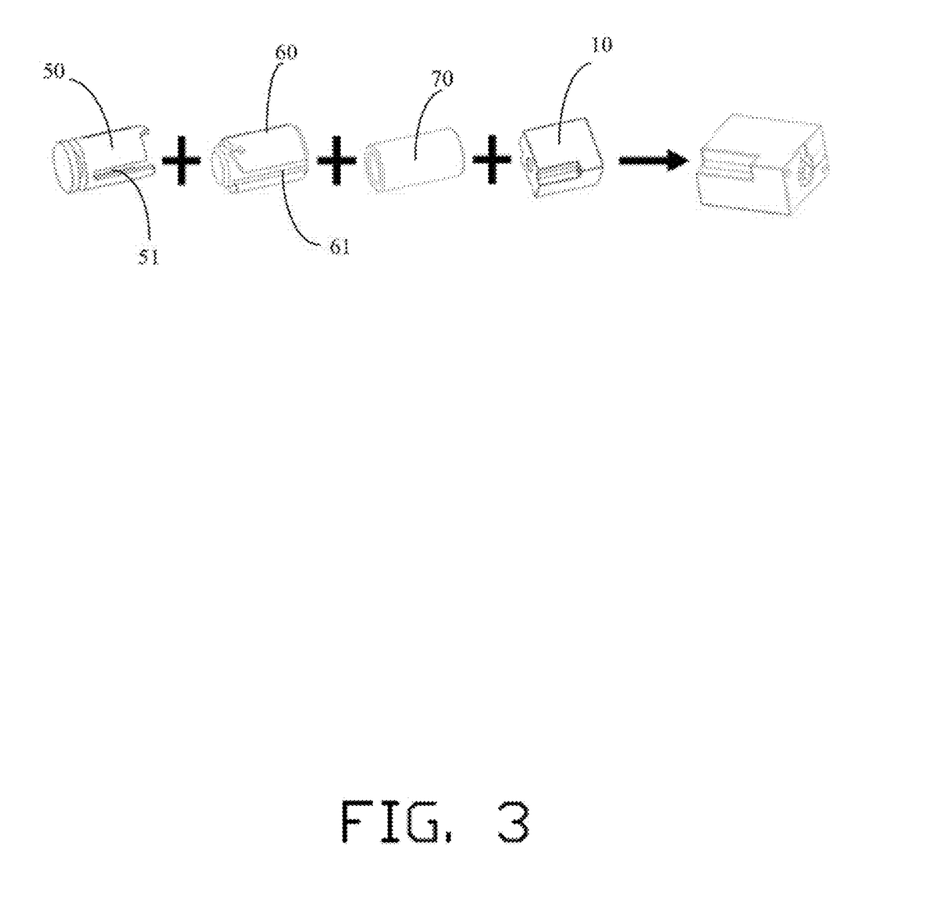
FIG. 3 is an exploded, isometric view of the first valve body of FIG. 2.

The end cover 40 is a substantially rectangular plate. In the illustrated embodiment, the end cover 40 is fastened to an end of the second valve body 20 away from the first valve body 10 via two fastening members 11.

In assembly of the pneumatic control valve 100, the fastening tube 70 is fastened in the receiving hole 16, and the pushing block 50 and the rotating block 60 are slidably received in the fastening tube 70. A portion of each of the three guiding ribs 18 is received in one of the corresponding sliding grooves 61, and the remaining portion of each of the three guiding ribs 18 is received in one of the corresponding guiding grooves 51. The three inclined surfaces 53 contact the three first spiral surfaces 63, respectively. The piston rod 31 is slidably received in the second valve body 20, the end cover 40 is fastened at an end of the second valve body 20 away from the first valve body 10, and an end of the piston rod 31 resists with an end of the rotating block 60, and the other end of the piston rod 31 is fastened to the end cover 40 via the elastic member 90.

Figure 9:
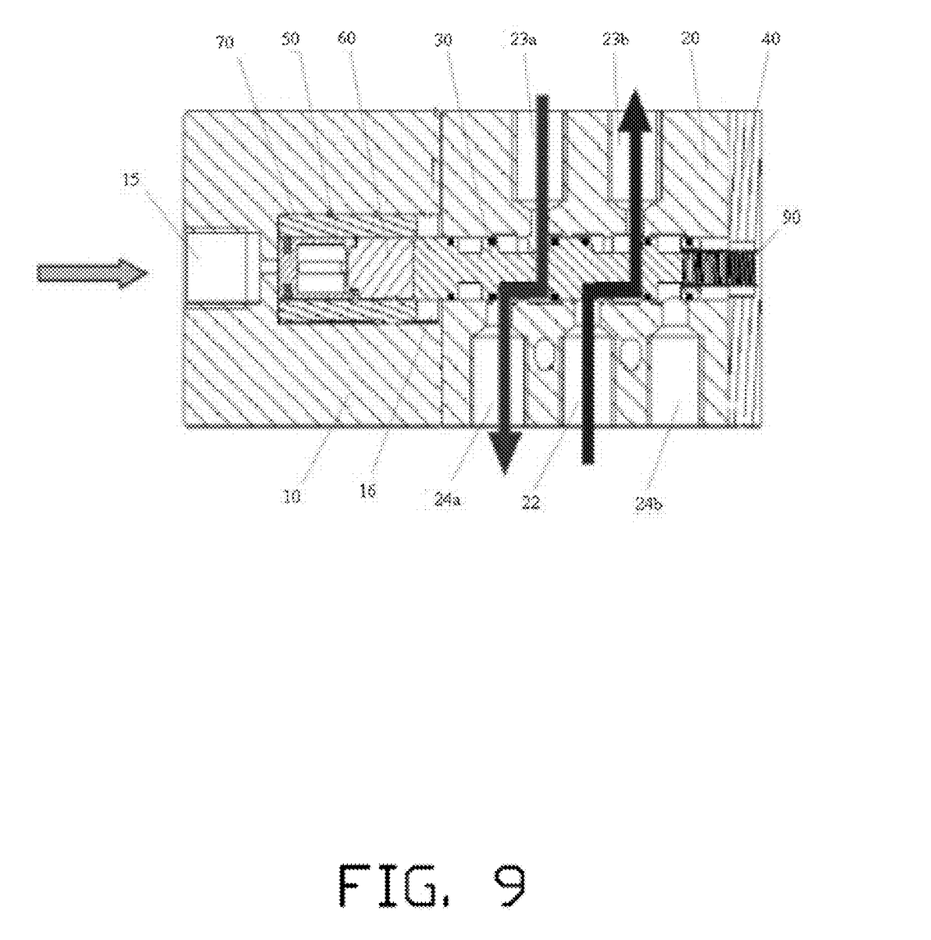
FIG. 9 is a cross-sectional view of the pneumatic control valve of FIG. 1, showing the pneumatic control valve in a first working state.

FIG. 9, in the illustrated embodiment, is a first working state of the pneumatic control valve 100 as shown in FIG. 1, which is the initial state of the pneumatic control valve 100. In this working state, the pushing block 50 is at an end of the fastening tube 70 adjacent to the first gas inlet 15, and the second gas inlet 22 communicates with the second gas outlet 23b. Compressed air filled in the second gas inlet 22 can flow into the second gas outlet 23b to drive a pneumatic mechanism connected to the second gas outlet 23b to work in a first state.

Figure 10:
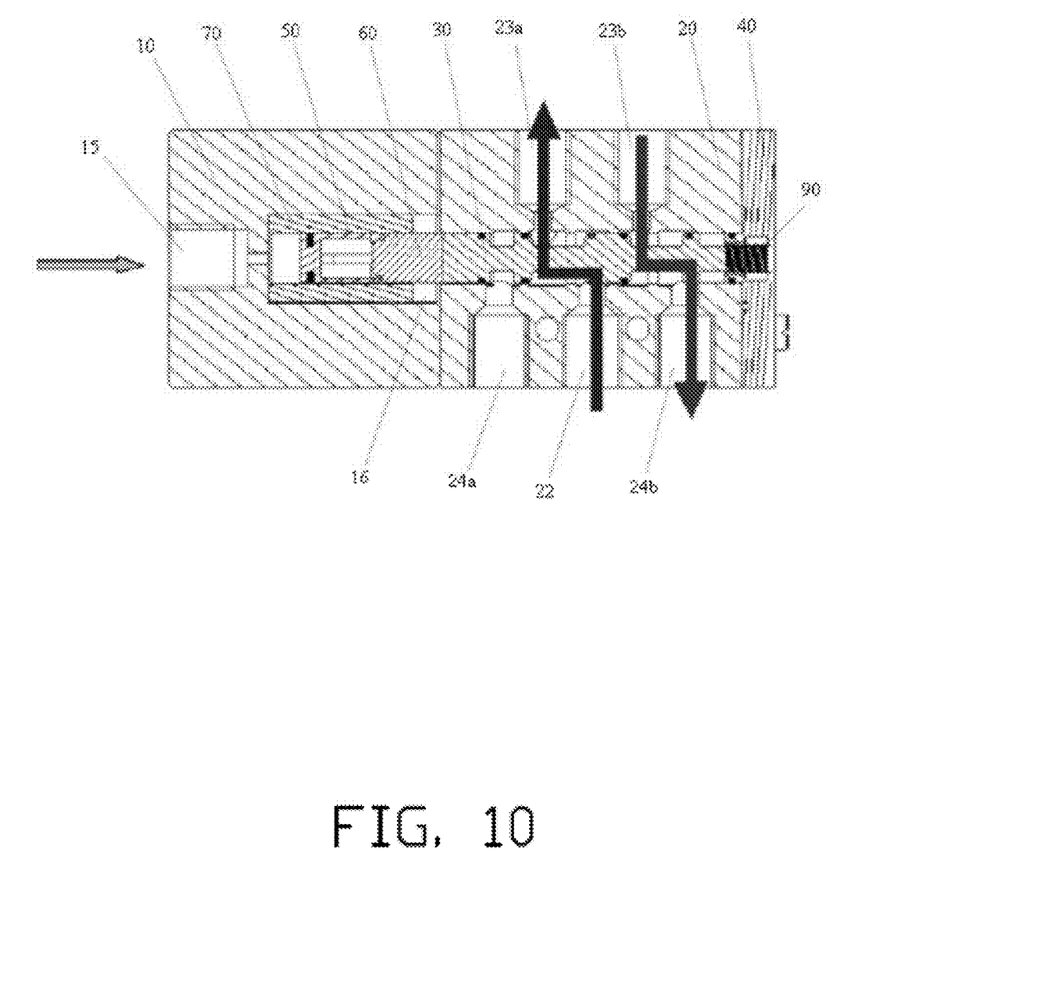
FIG. 10 is similar to FIG. 9, but showing the pneumatic control valve in a second working state.

FIG. 10 shows when a momentary injected compressed air flows into the pneumatic control valve 100 via the first gas inlet 15, the momentary injected compressed air drives the pushing block 50 to move towards the end cover 40 along the three guiding ribs 18. The pushing block 50 drives the rotating block 60 and the piston rod 31 to move towards the end cover 40. As the three inclined surfaces 53 contact the three first spiral surfaces 63, respectively, when the three guiding ribs 18 nearly slide out of the three sliding grooves 61 of the rotating block 60, the pushing block 50 drives the rotating block 60 to axially rotate as the pushing block 50 and the rotating block 60 move towards the end cover 40 linearly. After a small amount of rotation of the rotating block 60, the three inclined surfaces 182 of the three guiding ribs 18 contact the three first spiral surfaces 63, respectively, to drive the rotating block 60 to rotate until each of the three inclined surfaces 182 slide to a distal end of one first spiral surface 63 with each of the three guiding ribs 18 latching with a distal end of one second spiral surface 65. As one end of the rotating block 60 latches with the inclined surfaces 182 of the fastening tube 70 and the other end of the rotating block 60 resists with the elastic member 90, the axial movement of the rotating block 60 is restricted. At this time, each of the three inclined surfaces 53 is moved to contact one second spiral surface 65, the elastic member 90 is compressed, the piston rod 31 is moved to an end of the second valve body 20 adjacent to the end cover 40, and the second gas inlet 22 is turned or configured to communicate with the first gas outlet 23a. Compressed air filled in the second gas inlet 22 can flow into the first gas outlet 23a to drive a pneumatic mechanism connected to the first gas outlet 23a to work in a second state. This is the pneumatic control valve 100 operating at a second working state (as shown in FIG. 10).

When a momentary compressed air is flowed or injected into the pneumatic control valve 100 via the first gas inlet 15 again, the momentary injected compressed air drives the pushing block 50 to move towards the end cover 40, the pushing block 50 drives the rotating block 60 to move towards the end cover 40 linearly until each of the three guiding ribs 18 contact one corresponding second spiral surface 65 to drive the rotating block 60 to rotate until each of the three inclined surfaces 53 contact one corresponding first spiral surface 63 and each of the three guiding ribs 18 slide into one corresponding sliding groove 61. At this time, the elastic force of the elastic member 90 drives the piston rod 31 to move towards the first gas inlet 15, the piston rod 31 drives the rotating block 60 to move towards the first gas inlet 15 along the guiding ribs 18 until the pneumatic control valve 100 returns to the initial state.

In an alternative embodiment, the fastening tube 70 is omitted, and the three guiding ribs 18 are formed in the inner surface of the first valve body 10.

It should be noted that the number of the guiding ribs 18 may be two or more, and the number of the guiding grooves 51 or the sliding grooves 61 is the same as the number of the guiding ribs 18.

The pneumatic control valve 100 only requires a momentary burst of compressed air to flow into the first gas inlet 15 to drive the piston rod 31 to move to selectively communicate the second gas inlet 22 with the first gas outlet 23a or the second gas outlet 23b, and the working state of the pneumatic control valve 100 can be easily changed by the momentary burst of compressed air operating in one direction. It is convenient and safe for the operator to operate the pneumatic control valve 100 to control a compressed air source connected to the second gas inlet 22 to drive the pneumatic mechanisms connected to the pneumatic control valve 100 to work.

Figure 11:
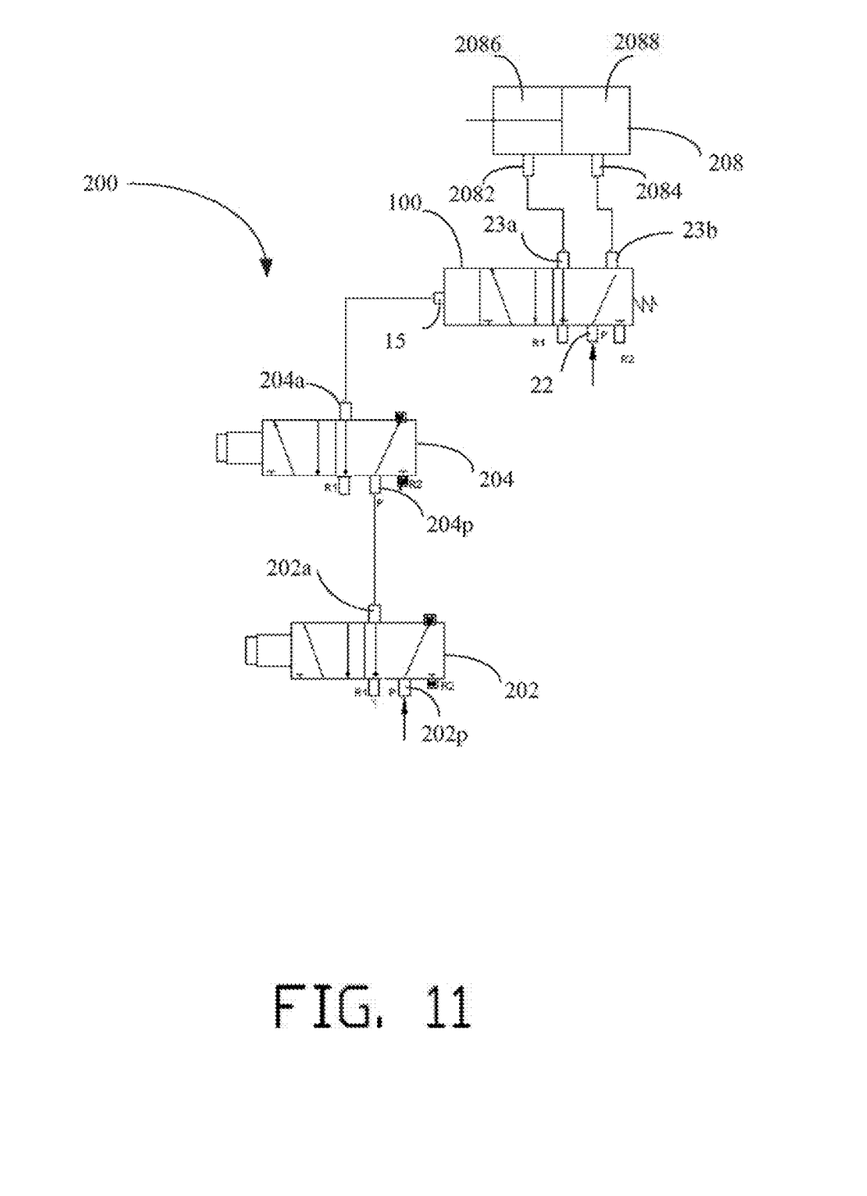
FIG. 11 is a control chart for a pneumatic control system using the pneumatic control valve of FIG. 1.

FIG. 11 shows the pneumatic control valve 100 used in a pneumatic control system 200. An embodiment of the pneumatic control system 200 includes a first manual control valve 202, a second manual control valve 204, the pneumatic control valve 100, and a pneumatic cylinder 208. The first manual control valve 202 includes a gas inlet 202p and a gas outlet 202a communicating with the gas inlet 202p. The second manual control valve 204 includes a gas inlet 204p and a gas outlet 204a communicating with the gas inlet 204p. The pneumatic cylinder 208 defines two pneumatic chambers 2086, 2088 and two gas inlets 2082, 2084. The gas outlet 202a communicates with the gas inlet 204p, and the gas outlet 204a communicates with the first gas inlet 15. The two gas outlets 23a, 23b communicate with the two pneumatic chambers 2086, 2088 respectively via the two gas inlets 2082, 2084. As the first the manual control valve 202, the second manual control valve 204 and the pneumatic control valve 100 communicate with each other in series, the two manual control valves 202, 204 must be operated to control the pneumatic control valve 100 at the same time. It can prevent the pneumatic control system 200 from unintended accidental operation and thereby improve the safety of the operator.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A pneumatic control system comprising:
a first manual control valve comprising a gas inlet and a gas outlet communicating with the gas inlet;
a second manual control valve comprising a gas inlet and a gas outlet communicating with the gas inlet;
a pneumatic control valve comprising a first valve body, having the opposite ends of the first valve body respectively defining a first gas inlet and a receiving hole communicating with the first gas inlet; a fastening tube fastened in the receiving hole of the first valve body, the fastening tube axially forming a plurality of guiding ribs evenly positioned on the inner surface of the fastening tube, and each of the guiding ribs forming an inclined surface at a distal end thereof; a pushing block slidably received in one end of the fastening tube adjacent to the first gas inlet; a rotating block slidably received in the other end of the fastening tube; a second valve body connected to an end of the first valve body adjacent to the receiving hole of the first valve body; an end cover fastened on an end of the second valve body away from the first valve body; an elastic member;
and a piston received in the second valve body with a first end of the piston resisting with the rotating block and a second end of the piston opposite to the first end fastened to the end cover via the elastic member, the pushing block axially defining a plurality of guiding grooves at the outer surface of the pushing block corresponding to the guiding ribs and forms a plurality of inclined surfaces between the guiding grooves at an end of the pushing block adjacent to the rotating block, and the rotating block axially defining a plurality of sliding grooves in the outer surface of the rotating block corresponding to the guiding ribs and defining a plurality of first spiral surfaces and a plurality of second spiral surfaces adjacent to the first spiral surfaces between the sliding grooves at an end of the rotating block adjacent to the pushing block; and a pneumatic cylinder comprising two pneumatic chambers and two gas inlets, wherein the gas outlet of the first manual control valve communicates with the gas inlet of the second manual control valve, the gas outlet of the second manual control valve communicates with the first gas inlet of the pneumatic control valve, and two gas outlets of the pneumatic control valve communicate with the two pneumatic chambers respectively via the two gas inlets of the pneumatic cylinder.

2. The pneumatic control valve of claim 1, wherein the second valve body defines a second gas inlet and two vents at a first side wall of the second valve body and a first gas outlet and a second gas outlet at a second side wall of the second valve body opposite to the first side wall, when the piston is at one end of the second valve body adjacent to the first valve body, the second gas inlet communicates with the second gas outlet, and when the piston is at the other end of the second valve body, the second gas inlet communicates with the first gas outlet.

3. The pneumatic control valve of claim 1, wherein the number of the guiding ribs is three, and the number of the guiding grooves or the sliding grooves of the rotating block is the same as the number of the guiding ribs.

4. The pneumatic control valve of claim 3, wherein the number of the inclined surfaces of the pushing block is three, and the number of the first spiral surfaces or the second spiral surfaces is the same as the number of the inclined surfaces of the pushing block.

5. The pneumatic control valve of claim 1, wherein the piston comprises a piston rod and a plurality of piston heads sleeved on the piston rod, a first end of the piston rod resists with the rotating block and a second end of the piston rod opposite to the first end thereof is fastened to the end cover via the elastic member.

6. The pneumatic control valve of claim 5, wherein the piston further comprises a plurality of seal members sleeved on the piston heads correspondingly.

7. A pneumatic control system comprising:
a first manual control valve comprising a gas inlet and a gas outlet communicating with the gas inlet; and
a pneumatic control valve comprising:
a first valve body, having the opposite ends of the first valve body respectively defining a first gas inlet and a receiving hole communicating with the first gas inlet, the first gas inlet communicating with the gas outlet of the first manual control valve;
a fastening tube fastened in the receiving hole of the first valve body, the fastening tube axially forming a plurality of guiding ribs evenly positioned on the inner surface of the fastening tube, and each of the guiding ribs forming an inclined surface at a distal end thereof;
a pushing block slidably received in one end of the fastening tube adjacent to the first gas inlet;
a rotating block slidably received in the other end of the fastening tube;
a second valve body connected to an end of the first valve body adjacent to the receiving hole of the first valve body;
an end cover fastened on an end of the second valve body away from the first valve body;
an elastic member; and
a piston received in the second valve body with a first end of the piston resisting with the rotating block and a second end of the piston opposite to the first end fastened to the end cover via the elastic member,
wherein the pushing block axially defines a plurality of guiding grooves at the outer surface of the pushing block corresponding to the guiding ribs and forms a plurality of inclined surfaces between the guiding grooves at an end of the pushing block adjacent to the rotating block; the rotating block axially defines a plurality of sliding grooves in the outer surface of the rotating block corresponding to the guiding ribs and defines a plurality of first spiral surfaces and a plurality of second spiral surfaces adjacent to the first spiral surfaces between the sliding grooves at an end of the rotating block adjacent to the pushing block.

8. The pneumatic control valve of claim 7, wherein the second valve body defines a second gas inlet and two vents at a first side wall of the second valve body and a first gas outlet and a second gas outlet at a second side wall of the second valve body opposite to the first side wall, when the piston is at one end of the second valve body adjacent to the first valve body, the second gas inlet communicates with the second gas outlet, and when the piston is at the other end of the second valve body, the second gas inlet communicates with the first gas outlet.

9. The pneumatic control valve of claim 7, wherein the piston comprises a piston rod and a plurality of piston heads sleeved on the piston rod, a first end of the piston rod resists with the rotating block and a second end of the piston rod opposite to the first end thereof is fastened to the end cover via the elastic member.

10. A pneumatic control system comprising:
a first manual control valve comprising a gas inlet and a gas outlet communicating with the gas inlet; and
a pneumatic control valve comprising:
a first valve body, having the opposite ends of the first valve body defining a first gas inlet communicating with the gas inlet and a receiving hole communicating with the first gas inlet, respectively;
a plurality of guiding ribs being evenly positioned on the inner surface of the receiving hole away from the first gas inlet, and each of the guiding ribs forming an inclined surface at a distal end thereof;
a pushing block slidably received in one end of the receiving hole adjacent to the first gas inlet;
a rotating block slidably received in the other end of the receiving hole;
a second valve body connected to an end of the first valve body adjacent to the receiving hole of the first valve body;
an end cover fastened on an end of the second valve body away from the first valve body;
an elastic member; and
a piston received in the second valve body with one end of the piston resisting with the rotating block and the other end of the piston fastened to the end cover via the elastic member,
wherein the pushing block axially defines a plurality of guiding grooves at the outer surface of the pushing block corresponding to the guiding ribs and forms a plurality of inclined surfaces between the guiding grooves at an end of the pushing block adjacent to the rotating block; the rotating block axially defines a plurality of sliding grooves at the outer surface of the rotating block corresponding to the guiding ribs and defines a plurality of first spiral surfaces and a plurality of second spiral surfaces adjacent to the first spiral surfaces between the sliding grooves at an end of the rotating block adjacent to the pushing block.

11. The pneumatic control valve of claim 10, wherein the second valve body defines a second gas inlet and two vents at a first side wall of the second valve body and a first gas outlet and a second gas outlet at a second side wall of the second valve body opposite to the first side wall, when the piston is at one end of the second valve body adjacent to the first valve body, the second gas inlet communicates with the second gas outlet, and when the piston is at the other end of the second valve body, the second gas inlet communicates with the first gas outlet.

12. The pneumatic control valve of claim 10, wherein the piston comprises a piston rod and a plurality of piston heads sleeved on the piston rod, a first end of the piston rod resists with the rotating block and a second end of the piston rod opposite to the first end thereof is fastened to the end cover via the elastic member.

\* \* \* \* \*